United States Patent
Kim et al.

(10) Patent No.: US 7,051,144 B2
(45) Date of Patent: May 23, 2006

(54) PORTABLE COMPUTER SYSTEM AND CONTROL METHOD FOR REDUCING POWER CONSUMPTION THEREIN

(75) Inventors: Moon-Kyou Kim, Suwon (KR); Byung-Lae Lee, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 320 days.

(21) Appl. No.: 09/906,619

(22) Filed: Jul. 18, 2001

(65) Prior Publication Data

US 2002/0062416 A1   May 23, 2002

(30) Foreign Application Priority Data

Nov. 17, 2000   (KR)   ................................ 2000-68603

(51) Int. Cl.
*G06F 13/14* (2006.01)

(52) U.S. Cl. ...................... 710/305; 710/306; 710/100; 713/300

(58) Field of Classification Search ................. 710/305, 710/100, 110, 313, 306; 713/324, 300
See application file for complete search history.

(56) References Cited

U.S. PATENT DOCUMENTS

| | | | | |
|---|---|---|---|---|
| 5,784,581 A | * | 7/1998 | Hannah | ........................ 710/110 |
| 5,799,196 A | * | 8/1998 | Flannery | ..................... 713/320 |
| 5,818,948 A | | 10/1998 | Gulick | |

FOREIGN PATENT DOCUMENTS

| | | |
|---|---|---|
| JP | 11-205412 | 7/1999 |
| JP | 2000-10907 | 1/2000 |
| JP | 2000-105638 | 4/2000 |
| KR | 1999-29215 | 4/1999 |
| KR | 2000-9370 | 2/2000 |

* cited by examiner

*Primary Examiner*—Rehana Perveen
*Assistant Examiner*—Kim T. Huynh
(74) *Attorney, Agent, or Firm*—Robert E. Bushnell, Esq.

(57) ABSTRACT

A portable computer includes: a central processing unit; a connection chipset connected to the central processing unit and internally provided with a Universal Serial Bus (USB) controller, the connection chipset also having a plurality of ports allowing peripheral devices to be connected to the connection chipset; a Universal Serial Bus hub coupled to the connection chipset, the Universal Serial Bus hub having a plurality of connection ports allowing a plurality of devices to be connected to the Universal Serial Bus hub; and a switching circuit connected between the Universal Serial Bus hub and the Universal Serial Bus controller, the switching circuit serving to transmit an output signal from the Universal Serial Bus controller to the Universal Serial Bus hub when at least one of the devices connected to the Universal Serial Bus hub is driven. A control method for the portable computer provides a control function for allowing or cutting off the transmission of the output signal from the Universal Serial Bus controller to the Universal Serial Bus hub in accordance with whether or not at least one of the devices connected to the Universal Serial Bus hub is driven. In accordance with this configuration, the central processing unit can be maintained in a C3-state insofar as the Universal Serial Bus hub is mounted in a fashion meeting the ACPI specification. Therefore, it is possible to achieve a reduction in power consumption.

27 Claims, 3 Drawing Sheets

PORTABLE COMPUTER SYSTEM AND CONTROL METHOD FOR REDUCING POWER CONSUMPTION THEREIN

CLAIM OF PRIORITY

This application makes reference to, incorporates the same herein, and claims all benefits accruing under 35 U.S.C. §119 from my application PORTABLE COMPUTER SYSTEM AND CONTROL METHOD THEREOF filed with the Korean Industrial Property Office on Nov. 17, 2000 and there duly assigned Ser. No. 68603/2000.

BACKGROUND OF THE INVENTION

1. Technical Field

The present invention relates to a portable computer system and a method for controlling the portable computer system.

2. Related Art

Portable computers are well known, in which a computer body, a monitor, and a keyboard are integrally coupled together to provide a portable structure, as compared to so called "desktop computers", in which a computer body, a monitor, and a keyboard are configured to be separated from one another, so that they are used in a state laid on a desk, for example. Such a portable computer includes a computer body having a main board mounted with a central processing unit (CPU), a random access memory (RAM), a disk driver, a graphic card, and other diverse cards, a monitor electrically connected to the computer body and adapted to externally transmit a video signal from the computer body, and an input unit including a keyboard and a mouse to input desired information to the computer body. A portable computer can be a laptop computer, a notebook computer, a personal digital assistant (PDA), a palm-sized computer, or other type of movable computer.

Typically, portable computers mentioned above perform a power management function. A power management system has been developed from that having a simple power management function, which was developed at the early development stage, relative to that having an advanced power management function. Current IBM-compatible computer systems mainly use the power management system having the advanced power management function of an advanced power management (APM) system in order to achieve a considerable reduction of the power consumption.

Meanwhile, a computer system is processed in accordance with a booting procedure proceeding from a booting by a basic input output system (BIOS) to a booting by an operating system so that it is booted to allow the user to use the computer system after a power-on of the computer system. In association with the booting procedure, however, the computer system inevitably involves an increase in booting time resulting from an increased complexity of its configuration and increased numbers of operating systems and diverse application programs loaded therein.

In order to achieve an improved power management and a rapid re-use of the computer system, Intel Corporation, Microsoft Corporation, and Toshiba Corporation have issued "Advanced Configuration and Power Interface (ACPI) Specification Revision 1.0" on Dec. 22, 1996. Computer systems recently developed are configured to meet the ACPI specification so that they achieve an improved power management and a rapid booting procedure.

In accordance with the ACPI specification, the power management state of a computer system is mainly defined by 6 sleeping states, that is, S0 to S5-states. The S0-state corresponds to a normal state. The S1 to S4-states correspond to states in which the power consumption is gradually reduced, respectively, whereas the S5-state corresponds to a state in which the supply of power to the entire portion of the computer system is cut off. The computer system having the above mentioned power management function uses a power supply device having a power supply configuration providing a main power and a standby power, separated from each other, to support an ATX specification. The power supply device supporting the ATX specification always outputs the standby power in a state in which an external power is applied. The standby power is supplied to a power management controller included in the computer system.

The S3-state according to the ACPI specification is adapted for a rapid re-use of the computer system. In the S3-state, the supply of power to all hardware units of the computer system, except for the system memory (RAM) formed by volatile memories and the power management controller, is cut off. The procedure, in which the computer system enters the S3-state, is referred to as a "suspend-to-RAM". During this suspend-to-RAM procedure, a system context is stored in the system memory.

When a mode corresponding to the S3-state is set in the computer system, the content of the current task is stored in the system memory, that is, RAM. Following this storage, the supply of power is completely cut off. The task content stored in the system memory is retrieved in a wake-up operation for converting the operating mode of the computer system from the S3-state to a normal state, so that the computer system can be rapidly re-used without any execution of the general booting procedure. Thus, it is natural that the user is favorable to computer systems capable of supporting the S3-state according to the ACPI specification, thereby achieving an effect of greatly reducing the power consumption while allowing a rapid system re-use.

In the S3-state, it is possible to minimize the power consumption because the computer system enters the standby mode under the condition in which the content of the current task has been stored in the RAM formed by volatile memories. Also, there is an improvement in processing efficiency in that when power is applied again to the computer system for a re-execution of the task, the task content stored in the RAM is retrieved in response to the re-application of power to the computer system.

Meanwhile, the power consumption made by diverse devices mounted to the computer system, such as a central processing unit (CPU), a compact disc-read only memory (CD-ROM), a hard disk drive (HDD), and a modem, is carried out in a stepwise fashion in accordance with the state of the computer system. That is, the power consumption state of the computer system is defined by C0 to C3-states associated with the central processing unit, and D0 to D3-states associated with the compact disc-read only memory (CD-ROM), a hard disk drive (HDD), and modem.

Here, a lower number of the power consumption state corresponds to a reduced power consumption. Accordingly, the C0-state corresponds to the state in which the central processing unit is fully driven. In this state, the central processing unit is allowed to recognize peripheral devices. In the C2-state, the central processing unit is still driven. In this C2-state, however, outputting of information from a phase locked loop (PLL) included in the central processing unit is cut off. In a manner similar to the C0-state, the central processing unit is still allowed to recognize the peripheral devices in the C2-state.

Where the peripheral devices are not driven, it is desirable to fundamentally cut off the transmission of signals from those peripheral devices to the central processing unit, thereby preventing the central processing unit from recognizing the peripheral devices. In accordance with this configuration, it is possible to avoid an unnecessary power consumption. This state corresponds to the C3-state. In this C3-state, a further reduction in power consumption is achieved. This provides an advantage in that the portable computer can be used for an increased period of time in every discharge operation.

In a portable computer system, however, there may be a disadvantage where a separate Universal Serial Bus (USB) hub is mounted to the computer system in order to mount diverse devices such as MP3 and Bluetooth devices. That is, the central processing unit of the computer system repeatedly conducts an unnecessary checking procedure for the Universal Serial Bus hub and associated devices, even when those devices are in an inactive state. The repeated checking operation can be considered a polling operation. The polling operation can be performed to see if a device is present, to check the status of a device, to identify a device, to see if a device has been removed, and for other reasons. Bluetooth is a wireless short-range networking technology intended to simplify communications among devices such as portable computers, mobile telephones, digital cameras, printers, and other devices.

Due to the repeated checking operation of the central processing unit for the Universal Serial Bus hub and associated devices, the computer system cannot be maintained in the C3-state, thereby resulting in an increase in power consumption. Furthermore, the generation of heat in the computer body increases. This results in a problem in that the memory and diverse chips internally installed in the computer body may be damaged, so that their life is reduced.

SUMMARY OF THE INVENTION

Accordingly, the present invention has been made keeping in mind the above-described problems and an object of the invention is to provide a portable computer system which is capable of maintaining a central processing unit to be in a C3-state according to the ACPI specification under the condition in which a Universal Serial Bus hub is mounted, thereby achieving a reduction in power consumption while reducing the generation of heat from a computer body.

Another object of the invention is to provide a control method for controlling the portable computer system which is capable of maintaining a central processing unit to be in a C3-state according to the ACPI specification under the condition in which a Universal Serial Bus hub is mounted, thereby achieving a reduction in power consumption while reducing the generation of heat from a computer body.

In accordance with one aspect of the present invention, these and other objects may be accomplished by the provision of a portable computer comprising: a central processing unit; a connection chipset connected to the central processing unit and internally provided with a Universal Serial Bus controller, the connection chipset also having a plurality of ports allowing peripheral devices to be connected to the connection chipset; a Universal Serial Bus hub coupled to the connection chipset, the Universal Serial Bus hub having a plurality of connection ports allowing a plurality of devices to be connected to the Universal Serial Bus hub; and a switching circuit connected between the Universal Serial Bus hub and the Universal Serial Bus controller, the switching circuit serving to transmit an output signal from the Universal Serial Bus controller to the Universal Serial Bus hub when at least one of the devices connected to the Universal Serial Bus hub is driven.

Preferably, the switching circuit comprises a switching unit connected between the Universal Serial Bus controller and the Universal Serial Bus hub and adapted to selectively cut off a transmission of a signal from the Universal Serial Bus controller to the Universal Serial Bus hub, and a control unit for turning on the switching unit when at least one of the devices connected to the Universal Serial Bus hub is driven.

The control unit preferably performs a control function for turning on the switching unit when at least one of the devices connected to the Universal Serial Bus hub is driven, thereby allowing the transmission of the signal from the Universal Serial Bus controller to the Universal Serial Bus hub, and a control for turning off the switching unit when all of the devices connected to the Universal Serial Bus hub are in an inactive state, thereby cutting off the transmission of the signal from the Universal Bus controller to the Universal Serial Bus hub.

The portable computer may further comprise device driving units respectively associated with the devices connected to the Universal Serial Bus hub, each of the device driving units serving to drive an associated one of the devices connected to the Universal Serial Bus hub under a control of the control unit.

In accordance with another aspect of the present invention, this and other objects may also be accomplished by the provision of a method for controlling a portable computer including a central processing unit, a connection chipset connected to the central processing unit and internally provided with a Universal Serial Bus controller, the connection chipset also having a plurality of ports allowing peripheral devices to be connected to the connection chipset, a Universal Serial Bus hub coupled to the connection chipset, the Universal Serial Bus hub having a plurality of connection ports allowing a plurality of devices to be connected to the Universal Serial Bus hub, and a switching circuit connected between the Universal Serial Bus hub and the Universal Serial Bus controller, the switching circuit serving to selectively cut off a transmission of an output signal from the Universal Serial Bus controller to the Universal Serial Bus hub, comprising the steps of: recognizing an active state in which at least one of the devices connected to the Universal Serial Bus hub is driven; and turning on the switching unit, based on a signal representing the recognition of the active state, thereby allowing an output signal from the Universal Serial Bus controller to be transmitted to the Universal Serial Bus hub.

The control method may further comprise the steps of recognizing an inactive state in which all the devices connected to the Universal Serial Bus hub are not driven, and turning off the switching unit, based on a signal representing the recognition of the inactive state, thereby cutting off the transmission of the output signal from the Universal Serial Bus controller to the Universal Serial Bus hub.

To achieve these and other objects in accordance with the principles of the present invention, as embodied and broadly described, the present invention provides an apparatus, comprising: a central processing unit; a connection chipset connected to said central processing unit, having a Universal Serial Bus controller, having a first plurality of ports connecting a first plurality of devices to said connection chipset; a Universal Serial Bus hub coupled to said connection chipset, having a second plurality of ports connecting a second plurality of devices to said Universal Serial Bus hub; and a switching circuit connected between said Universal Serial Bus hub and said Universal Serial Bus controller, and transmitting a signal from said Universal Serial Bus controller to said Universal Serial Bus hub when at least one device among said second plurality of devices is driven.

To achieve these and other objects in accordance with the principles of the present invention, as embodied and broadly described, the present invention provides a method, comprising: detecting an active state, said detecting of said active state corresponding to detecting when at least one device is driven, said at least one device being among a plurality of devices connected to a Universal Serial Bus hub; when said active state is detected, switching on a switching unit to transmit an output signal from a Universal Serial Bus controller to said Universal Serial Bus hub through said switching unit.

To achieve these and other objects in accordance with the principles of the present invention, as embodied and broadly described, the present invention provides a computer storage medium having stored thereon a set of instructions implementing a method, said set of instructions comprising one or more instructions for: detecting an active state, said detecting of said active state corresponding to detecting when at least one device is driven, said at least one device being among a plurality of devices connected to a Universal Serial Bus hub; when said active state is detected, switching on a switching unit to transmit an output signal from a Universal Serial Bus controller to said Universal Serial Bus hub through said switching unit.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENTS

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions or constructions are not described in detail since they would obscure the invention in unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 1:
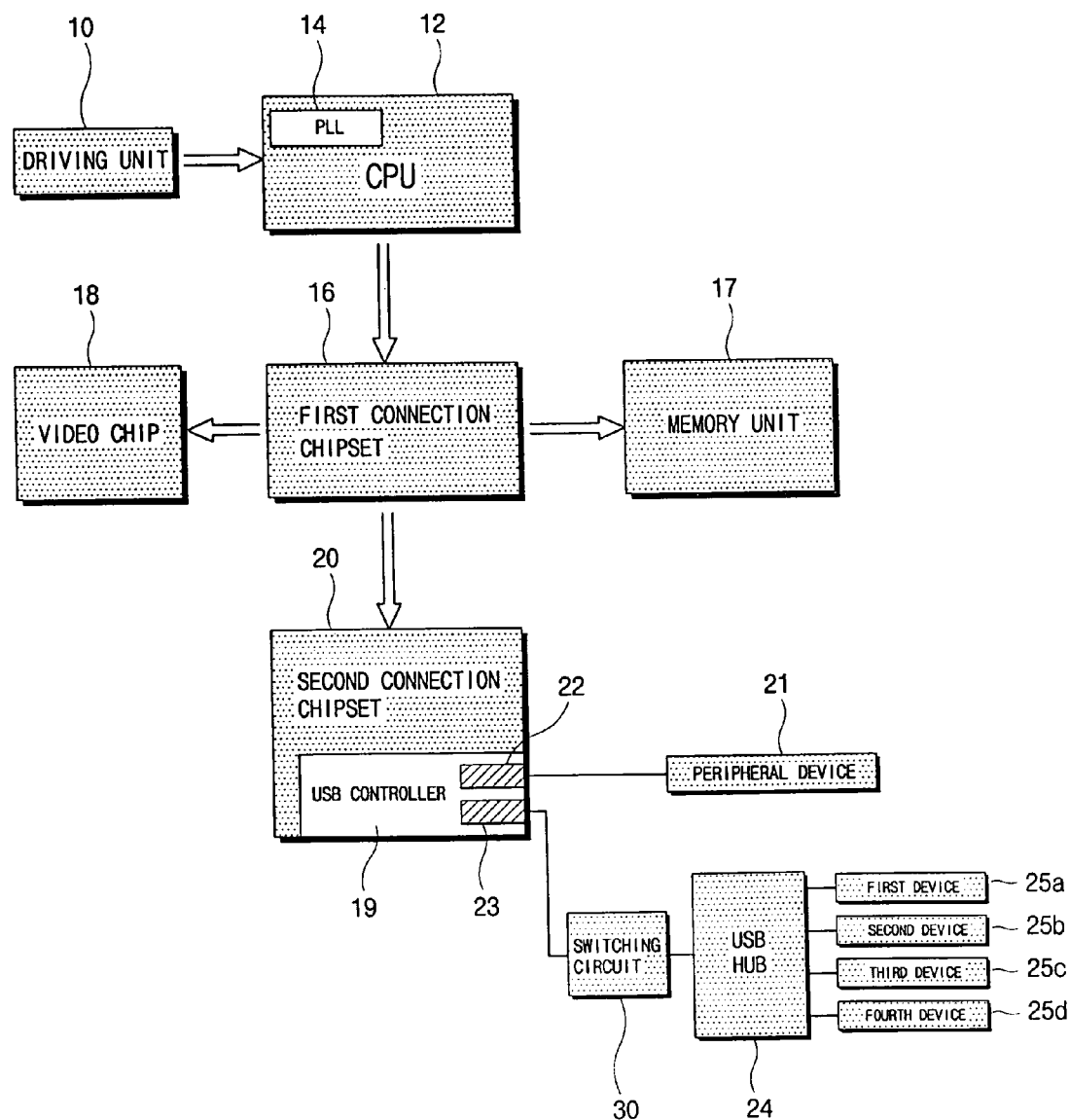
FIG. 1 is a block diagram illustrating the configuration of a portable computer system, in accordance with the principles of the present invention.

Now, the present invention will be described in detail, with reference to the annexed drawings. FIG. 1 is a block diagram illustrating the configuration of a portable computer system according to the present invention. As shown in FIG. 1, the portable computer system of the present invention conducts a booting procedure proceeding from a booting by a BIOS to a booting by an operating system. Following the booting procedure, a central processing unit (CPU) 12 is driven by a driving unit 10.

A phase locked loop (PLL) 14 included in the CPU 12 transmits information to a first connection chipset 16. The PLL 14 uses an information transmission scheme in which speed control information is included in a data stream to be transmitted. At a receiving end, in which the speed control information is received, the local clock of the receiving end is fixed with respect to the received speed control information, thereby allowing extraction of signal components.

The first connection chipset 16 transmits the information received from the PLL 14 to devices such as a memory unit 17 and a video chip 18 while transmitting the received information to a second connection chipset 20. The second connection chipset 20 includes a Universal Serial Bus (USB) controller 19 connected to the PLL 14 of the CPU 12, and first and second ports 22 and 23 allowing peripheral devices 21, such as a mouse and a keyboard, to be connected to the second connection chipset 20.

The peripheral device 21, such as a mouse, is connected to the first port 22. A USB hub 24, to which first through fourth devices 25a to 25d may be connected, is connected to the second port 23. The reason why the USB hub 24 is connected is to achieve a port expansion of the second connection chip set 20, thereby allowing connection of diverse devices, such as an MP3 device and a Bluetooth device. Although four devices, that is, the devices 25a to 25d, are connected to the USB hub 24 in the illustrated case, an increased or decreased number of such devices may be connected.

Figure 2:
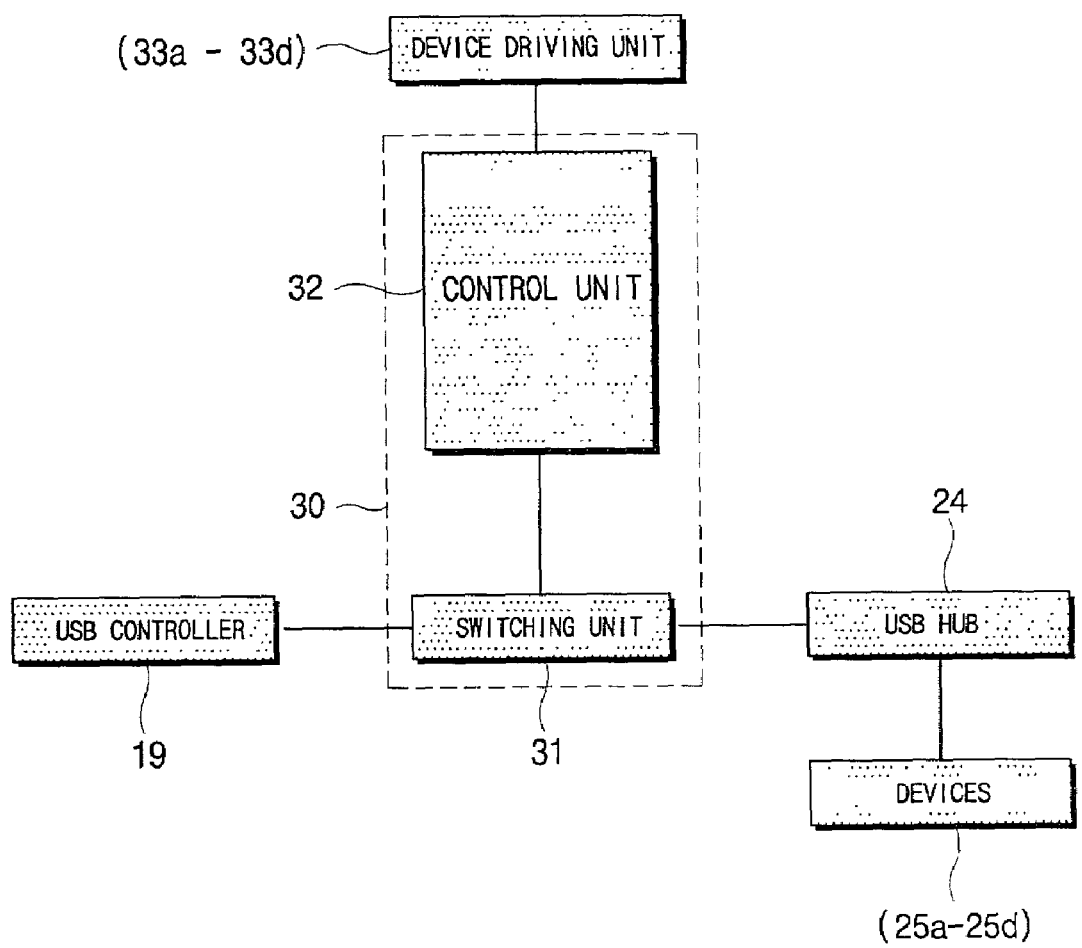
FIG. 2 is a block diagram illustrating an essential part of the portable computer system, in accordance with the principles of the present invention.
Figure 3:
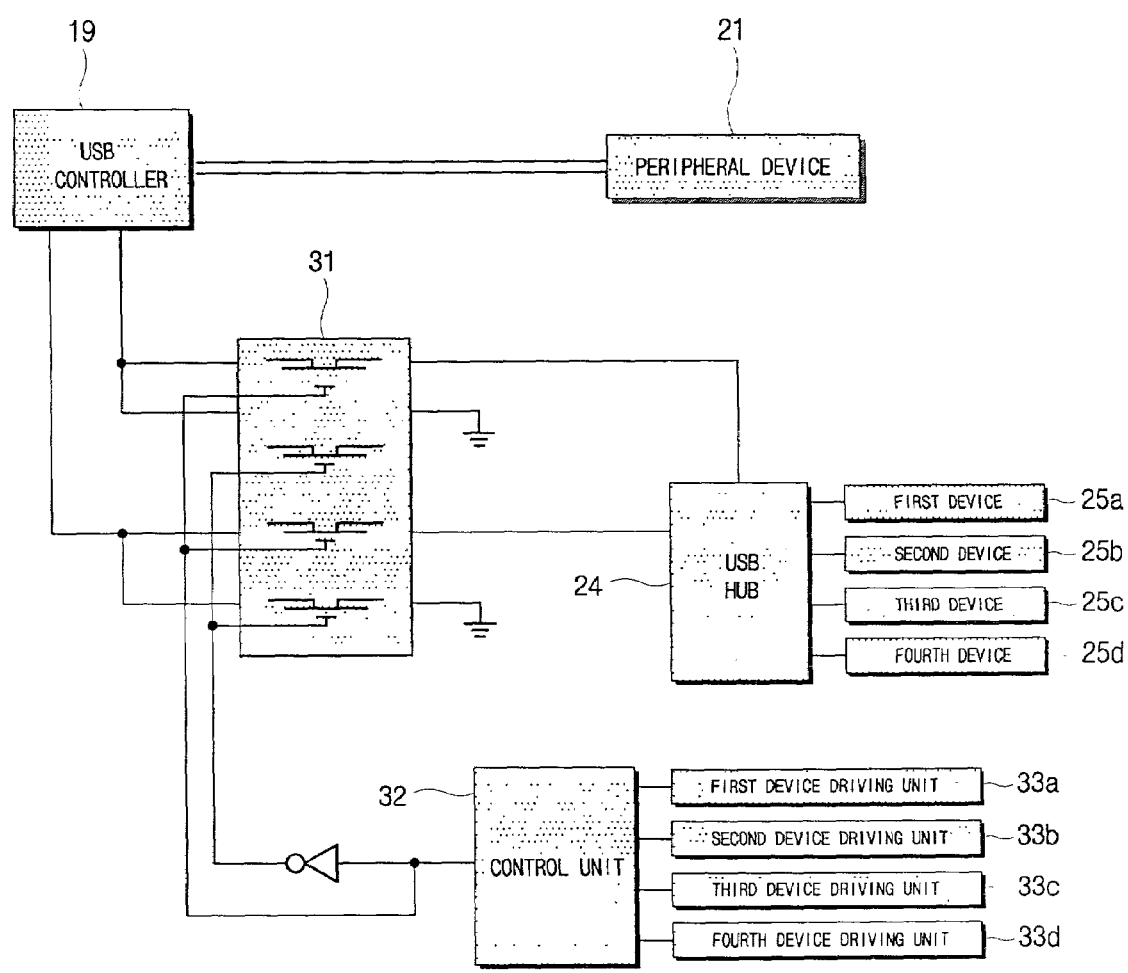
FIG. 3 is a circuit diagram corresponding to FIG. 2, in accordance with the principles of the present invention.

As shown in FIGS. 1 to 3, a switching circuit 30 is provided between the USB controller 19 and the USB hub 24 in order to selectively connect the USB controller 19 and the USB hub 24 to each other. As shown in FIGS. 2 and 3, the switching circuit 30 includes a switching unit 31 connected between the USB controller 19 and the USB hub 24 and adapted to selectively cut off the transmission of a signal from the USB controller 19 to the USB hub 24, and a control unit 32 for turning on or off the switching unit 31, based on the driving of at least one of the devices 25a to 25d connected to the USB hub 24.

Device driving units 33a to 33d respectively corresponding to the devices 25a to 25d may be connected to the control unit 32. Each of the device driving units 33a to 33d may have a button structure so that it is arranged outside the computer body. In this case, each device driving unit 33a to 33d may be activated in accordance with manipulation of a button switch provided at the device driving unit 33a to 33d. Alternatively, each of the device driving units 33a to 33d may be activated as an associated one of the devices 25a to 25d is driven in a software fashion.

A method for controlling the portable computer system having the above mentioned configuration in accordance with the present invention will now be described. Prior to the execution of the control method, the USB hub 24 is connected to the computer system in such a fashion that it is connected to the USB controller 19. Also, the first through fourth devices 25*a* to 25*d* are connected to the USB hub 24. For the convenience of description, it is assumed that the first device 25*a* corresponds to an MP3 device, and the second device 25*b* corresponds to a Bluetooth device.

When one of the devices 25*a* to 25*d*, for example, the first device 25*a* corresponding to the MP3 device, is driven, a high-level signal is generated from the first device driving unit 33*a* associated with the first device 25*a*. This high-level signal is transmitted to the control unit 32 which, in turn, turns on the switching unit 31, based on the high-level signal. At the turn-on state of the switching unit 31, an output signal from the USB controller 19 is allowed to be transmitted to the USB hub 24, and then to the first device 25*a*. At this time, the CPU 12 repeatedly checks the USB hub 24 along with the devices 25*a* to 25*d*.

Where the driving of the first device 25*a* is stopped in order to maintain all of the first through fourth devices 25*a* to 25*d* in an inactive state, each of the device driving units 33*a* to 33*d* respectively associated with the devices 25*a* to 25*d* generates a low-level signal, and transmits the signal to the control unit 32. In response to the low-level signal, the control unit 32 turns off the switching unit 31, thereby cutting off the transmission of signals from the USB controller 19 to the USB hub 24.

As is apparent from the above description, the portable computer system of the present invention includes the USB hub 24 coupled to the connection chipset 20 and provided with a plurality of connection ports respectively allowing a plurality of devices 25*a* to 25*d* to be connected to the USB hub 24, the switching unit 31 connected between the USB hub 24 and the USB controller 19 to selectively cut off the transmission of a signal from the USB controller 19 to the USB hub 24, and the control unit 32 for turning on or off the switching unit 31 based on the driving operation of at least one of the devices 25*a* to 25*d* connected to the USB hub 24. In accordance with this configuration, the CPU 12 can be maintained in the C3-state insofar as the Universal Serial Bus hub is mounted in a fashion meeting the ACPI specification. Therefore, it is possible to achieve a reduction in power consumption while reducing the generation of heat from the computer body.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:
   a central processing unit;
   a connection chipset connected to said central processing unit, said connection chipset having a Universal Serial Bus controller having a first plurality of ports for connecting a first plurality of devices to said connection chipset;
   a Universal Serial Bus hub coupled to said connection chipset, and having a second plurality of ports connecting a second plurality of devices to said Universal Serial Bus hub; and
   a switching circuit connected between said Universal Serial Bus controller and said Universal Serial Bus hub for cutting off transmission of a signal from said Universal Serial Bus controller to said Universal Serial Bus hub when every device of said second plurality of devices connected to said Universal Serial Bus hub is in an inactive state.

2. The apparatus of claim 1, further comprising a plurality of device driving units respectively corresponding to said second plurality of devices and connected to said Universal Serial Bus hub, each device driving unit driving a respective one of said second plurality of devices under control of said switching circuit.

3. The apparatus of claim 1, said switching circuit comprising:
   a switching unit connected between said Universal Serial Bus controller and said Universal Serial Bus hub for selectively cutting off transmission of the signal from said Universal Serial Bus controller to said Universal Serial Bus hub; and
   a control unit for switching off said switching unit when every device of said second plurality of devices connected to said Universal Serial Bus hub is in the inactive state, and for switching on said switching unit when at least one device of said second plurality of devices connected to said Universal Serial Bus hub is driven.

4. The apparatus of claim 3, further comprising a plurality of device driving units respectively corresponding to said second plurality of devices and connected to said Universal Serial Bus hub, each device driving unit driving a respective one of said second plurality of devices under control of said control unit.

5. The apparatus of claim 3, said switching unit transmitting the signal from said Universal Serial Bus controller to said Universal Serial Bus hub when switched on by said control unit.

6. The apparatus of claim 5, further comprising a plurality of device driving units respectively corresponding to said second plurality of devices and connected to said Universal Serial Bus hub, each device driving unit driving a respective one of said second plurality of devices under control of said control unit.

7. The apparatus of claim 5, said apparatus comprising a portable computer.

8. The apparatus of claim 7, said first plurality of devices comprising peripheral devices including at least a mouse and a keyboard, said second plurality of devices comprising at least a printer and a digital camera.

9. A method for controlling operation of a Universal, Serial Bus hub, a Universal Serial Bus controller, and a plurality of devices connected to the Universal Serial Bus, said method comprising the steps of:
   providing a switching unit between said Universal Serial Bus controller and said Universal Serial Bus hub for interconnecting said Universal Serial Bus controller and said Universal Serial Bus hub;
   detecting an inactive state corresponding to detecting when no device connected to said Universal Serial Bus hub is being driven; and
   when said inactive state is detected, switching off said switching unit to prevent an output signal from being transmitted from said Universal Serial Bus controller to said Universal Serial Bus hub through said switching unit.

10. The method of claim 9, further comprising the steps of:
    detecting an active state, said detecting of said active state corresponding to detecting when at least one device is driven, said at least one device being among the plurality of devices connected to said Universal Serial Bus hub; and
    when said active state is detected, switching on said switching unit to transmit the output signal from said Universal Serial Bus controller to said Universal Serial Bus hub through said switching unit.

11. The method of claim 10, further comprising the step of:
    generating a signal when said active state is detected, said switching on of said switching unit being performed in response to the generated signal.

12. The method of claim 11, further comprising the step of generating a signal when said inactive state is detected, said switching off of said switching unit being performed in response to the generated signal.

13. The method of claim 9, further comprising the step of:
    providing the portable computer with a connection chipset included therein, said portable computer having a central processing unit for controlling said connection chipset.

14. The method of claim 9, further comprising the step of providing at least one device driving unit, said driving of said at least one device being performed by said at least one device driving unit, said at least one device driving unit being connected to said switching unit.

15. The method of claim 9, the output signal from said Universal Serial Bus controller comprising a polling signal.

16. The method of claim 15, further comprising the step of generating a signal when said active state is detected, said switching on of said switching unit being performed in response to the generated signal.

17. A computer storage medium having a set of instructions stored therein for controlling operation of a Universal Serial Bus hub, a Universal Serial Bus controller, and a plurality of devices connected to the Universal Serial Bus, said set of instructions comprising:
    means for detecting an inactive state corresponding to detecting that no device connected to said Universal Serial Bus hub is being driven; and
    means responsive to said inactive state being detected for switching off a switching unit interconnecting said Universal Serial Bus controller and said Universal Serial Bus hub so as to prevent an output signal from being transmitted from said Universal Serial Bus controller to said Universal Serial Bus hub through said switching unit.

18. The computer storage medium of claim 17, said set of instructions further comprising:
    means for detecting an active state corresponding to driving of at least one device connected to said Universal Serial Bus hub; and
    means responsive to said active state being detected for switching on said switching unit interconnecting said Universal Serial Bus controller and said Universal Serial Bus hub so as to transmit said output signal from said Universal Serial Bus controller to said Universal Serial Bus hub through said switching unit.

19. The computer storage medium of claim 18, said set of instructions further comprising
    means for generating a signal when said active state is detected, said switching on of said switching unit being performed in response to the generated signal.

20. The computer storage medium of claim 17, said set of instructions further comprising means for generating a signal when an active state is detected, and means for switching on said switching unit in response to the generated signal.

21. The computer storage medium of claim 17, said set of instructions further comprising:
    means for connecting said Universal Serial Bus hub to said switching unit; and
    means for connecting said switching unit to said Universal Serial Bus controller, said Universal Serial Bus controller being included in a connection chipset of a portable computer, said portable computer having a central processing unit for controlling said connection chipset, said switching unit being disposed between said Universal Serial Bus controller and said Universal Serial Bus hub.

22. The computer storage medium of claim 17, said driving of said at least one device being performed by at least one device driving unit connected to said switching unit, each said at least one device driving unit corresponding to a respective said at least one device.

23. The computer storage medium of claim 17, the output signal from said Universal Serial Bus controller corresponding to a polling signal.

24. The computer storage medium of claim 23, said set of instructions further comprising means for generating a signal when said active state is detected, said switching on of said switching unit being performed in response to the generated signal.

25. The apparatus of claim 1, wherein the switching circuit maintains the central processing unit in a C3-state, thereby reducing power consumption, when every device of said second plurality of devices connected to said Universal Serial Bus hub is in the inactive state.

26. The method of claim 9, wherein the switching circuit maintain a central processing unit in a C3-state, thereby reducing power consumption, when the inactive state is detected.

27. The computer storage medium of claim 17, wherein switching off of the switching unit maintains a central processing unit in a C3-state, thereby reducing power consumption, when the inactive state is detected.

* * * * *